(12) United States Patent
Degauque et al.

(10) Patent No.: US 7,789,313 B2
(45) Date of Patent: Sep. 7, 2010

(54) FULLY SIMULTANEOUS INFORMATION ON VARIATIONS IN STATUS FOR AN OBJECT WITH A DUAL INTERFACE

(75) Inventors: Laurent Degauque, Roquevaire (FR); Stéphane Di-Vito, La Ciotat (FR); Jean-Paul Caruana, Marseilles (FR)

(73) Assignee: Gemalto, S.A., Gemenos (FR)

( * ) Notice: Subject to any disclaimer, the term of this patent is extended or adjusted under 35 U.S.C. 154(b) by 1029 days.

(21) Appl. No.: 10/583,333

(22) PCT Filed: Dec. 16, 2004

(86) PCT No.: PCT/EP2004/053553

§ 371 (c)(1),
(2), (4) Date: Jun. 16, 2006

(87) PCT Pub. No.: WO2005/066888

PCT Pub. Date: Jul. 21, 2005

(65) Prior Publication Data

US 2007/0095924 A1    May 3, 2007

(30) Foreign Application Priority Data

Dec. 17, 2003    (FR) .................................. 03 51092

(51) Int. Cl.
G06K 19/06    (2006.01)

(52) U.S. Cl. ..................... 235/492; 235/494; 235/487

(58) Field of Classification Search .................. 235/492, 235/494, 487; 702/60; 700/106; 434/249; 705/1, 7, 8, 10, 26, 37
See application file for complete search history.

(56) References Cited

U.S. PATENT DOCUMENTS

| | | | |
|---|---|---|---|
| 6,474,558 | B1 | 11/2002 | Reiner |
| 2006/0178918 | A1* | 8/2006 | Mikurak .................. 705/7 |

FOREIGN PATENT DOCUMENTS

| | | |
|---|---|---|
| EP | 1 174 820 A1 | 1/2002 |
| EP | 1251449 A1 | 10/2002 |
| WO | WO 02/103923 A1 | 12/2002 |
| WO | WO 03/051067 A2 | 6/2003 |

* cited by examiner

*Primary Examiner*—Karl D. Frech
(74) *Attorney, Agent, or Firm*—Buchanan, Ingersoll & Rooney, PC.

(57) ABSTRACT

An intelligent portable object has a dual interface and is equipped with a chip and is suitable for communicating with at least one electronic data transmission terminal via a contact interface according to standard ISO7816.3 and likewise without contact via a contactless interface and according to another contactless standard; a transition causing a variation of at least one status for the object. At least one information step, for example in real time, of the chip restituting variations in status, with at least a logical phase forming a supply controller, which ensure a configuration/information allowing a fully simultaneous functioning of applications resorting to the contact and/or contactless interface.

17 Claims, 3 Drawing Sheets

FULLY SIMULTANEOUS INFORMATION ON VARIATIONS IN STATUS FOR AN OBJECT WITH A DUAL INTERFACE

This disclosure is based upon French Application No. 03/51092 filed Dec. 17, 2003 and International Application No. PCT/EP2004/053553, filed Dec. 16, 2004, the contents of which are incorporated herein by reference.

BACKGROUND OF THE INVENTION

This invention relates to the secure function within an intelligent portable object of a communication interface without simultaneous contact with a contact or galvanic communication interface.

It also relates to the secure function of an application, the data of which pass through the interface without simultaneous contact with a distinct application, the data of which pass through the galvanic interface.

Fully simultaneous information on variations in status is aimed at here.

The invention also applies to an intelligent object comprising at least two interfaces of the same type or of a different type.

Known techniques and their terminology will be discussed beforehand.

One should draw a distinction here between intelligent portable objects on the one hand and electronic data transmission terminals on the other hand.

Intelligent portable objects include, for example, chip cards, electronic tickets, so-called "dongle" plugs or other modules such as those of proximity communication (e.g.: NFC) or semi-proximity (e.g.: BlueTooth). These objects are subject to standards which impose structures and functioning on them.

In particular, the objects in question here comply with standards explained in detail below:

ISO7816.3 concerning the galvanic communication interface, particularly sections 5.2 (activation) and paragraphs 532 (cold initialisation known as "RST"—refer to FIG. 2), 533 and 534 (clock pause known as "CLK"; description of modes requiring tolerance of this interruption);

In some examples, the object therefore complies with the standards:

ISO.IEC14443 concerning the contactless communication interface, particularly section 611 (response time known as "FDT"); and 3GPPTS11.11 concerning the objects known as "SIM" or similar, to be inserted in a terminal, particularly section 43 (galvanic communication interface).

It should be noted now that in some examples, the contactless interface includes an antenna: integrated in a module of this object; and/or; integrated in card body of this object; and/or; Integrated in the terminal to be secured and connected by a galvanic terminal board.

Therefore, the intelligent portable objects involved here are structurally with contact and contactless; they are known as "CombiCards" or dual interface objects. In other words, these objects simultaneously possess:

means and steps of remote communication via a contactless interface, with one or several electronic data transmission terminals and/or other distant portable objects; in addition to means and steps of communication by galvanic connection or with contact via a galvanic or ohmic interface known as "with contacts". It should already be noted that the contactless interface is in part at least internal to the object.

It should be underlined however that all the objects mentioned comply with standard ISO7816.3.

Concerning the contactless communication protocol used by the object, this involves, according to examples: ISO.IEC14443 (RF); communication specifications such as proximity communication like ECMA340 known as "NFC" or semi-proximity such as "BlueTooth" and other broadband communications known as "WiFi".

Among the current objects suitable for complying with the standard ISO7816.3 and a "contactless" standard, we should mention those which have chips: Hitachi AE45X (Renesas); Infineon SLE 66CLX320P; Philips P5CT072; STMicroElectronics ST19XR34.

In view of the antinomic constraints imparted, objects with a double module have been proposed More particularly, a card is known having on the one hand a first contact interface with its dedicated chip, and on the other hand a second contactless interface with a chip which is different from the contact chip, but which is dedicated too.

The invention does not concern "Twin" or "Hybrid" objects. As a matter of fact, they do not allow data exchange between contact and contactless chips. Nor a fully simultaneous functioning.

Now the transmission terminals involved in the invention will be discussed. These terminals are for example cell telephones (e.g.: GSM, 3GPP; UMTS; CDMA; etc.) portable personal assistants (e.g.: PDA), decoding boxes and computers. They are secured by at least one portable intelligent object.

It should be noted that the terminals mentioned here are not restrictively secured by an object with the physical format "SIM". Some designs of these terminals are cable (means and steps) of own wireless communication.

This communication complies for example with the standards GSM, 3GPP, UMTS, CDMA or similar. It is for the sake of simplicity that in the examples, the terminal and object comply with standard 3GPPTS11.11, particularly section 412 with regard to the physical format "SIM".

Specific features mentioned hereinafter and relating to prior art documents are incorporated into the description.

Document FR2776788 relates to multiple application memory cards which can be connected to the terminals dedicated to one application contained in the card. A configuration classified table is produced in the card.

This table is used as an access for recording, for each application, the first byte address of the message (ATR—TOTAL SOLID) and in a memory the address of other bytes message. The configuration table is addressed by the circular indexing, on each "Reset" (MaZ) signal transmitted by the terminal and thus supplies messages (ATR) to the terminal, for them to be analysed. Indexing is maintained until the terminal identifies a message corresponding to the application which it is dedicated to.

One aim of the invention is the functioning of a contact interface simultaneously with a contactless interface, in all statuses and according to all the transitions useful for cohabitation (it is said in this case that it is "in full use simultaneously") and indeed data exchange, between a contact application and a contactless application.

The invention also applies to an intelligent object comprising at least two interfaces. In particular, at least two contact interfaces or two contactless interfaces or a mixture of the two. For example, an interface according to one of the versions of ISO7816 and an interface for an object of the MMC (Multimedia Card), NFC or USB type.

To date, only a single one of these interfaces may be fully used at once. The fact that an interface is used inhibits or disturbs the functioning of the other in different ways.

First of all, it should be specified that the term "transaction" here denotes the transmission of at least one command from the terminal to the object, within the context of an application (e.g.: payment, identity, telephony or access).

For example, whilst a transaction of this type is in progress, via the contactless interface, the execution procedure of an application according to standard ISO7816.3 via the contact interface and therefore via the secure terminal using the portable object, makes provision in particular for supplying this object with electric current and providing it with a clock and activation of resetting of the contact interface. This terminates the contactless application.

The various different problems encountered as expounded initially in outline form and subsequently in description of process of embodiment in greater detail, particularly with regard to the statuses and transitions aimed at.

One problem encountered is that the chip is currently reinitialised owing to mandatory activation of resetting (MaZ) of the contact interface.

The aim of this is to ensure that a transaction in progress via the contactless interface continues to progress normally in this case. In other words, one seeks to allow maintenance of a contactless transaction in progress, during setting into operation of the contact interface.

Another problem encountered aims at two transitions which are currently impossible.

Following one of these transitions which are currently impossible, the object is in the process of processing an application in favour of the contactless interface and—the object—is called upon by the terminal via the contact interface so that this contactless application is processed simultaneously with another contact application which must begin in favour of the terminal.

This is the case for example for a terminal forming a cell telephone (the contact application securing a telephone conversation) and in which the contactless application aims at an access—transport, premises, etc.—:

It is not possible at present to initiate a transaction (e.g.: a telephone conversation) to be secured by the object via the contact interface, whilst an application, such as access authorisation, is already in progress via the contactless interface.

In general, up to now, the contactless application is abruptly aborted, since the beginning of an application in favour of the terminal via the contact interface results in resetting of the chip and often the loss of data useful for the contactless application.

Symmetrically, the other transition which is currently impossible is aimed at. According to the latter, when the object is suddenly called upon for an application via the contactless interface, whilst an application via the contact interface is already in progress for another application, the contact application ceases.

In the example of the secure cell terminal, if the contact application ceases at present—particularly if this terminal is halted—whilst the contactless application is in progress, the latter is abruptly aborted (reset and loss of data.)

This problem therefore lies in the simultaneous management (full use) of two concurrent applications: one contact application and one contactless application.

Currently, in these cases, the disappearance of either the resources of the contact interface, or a request or asynchronous contactless template, disturbs the application in progress or is disregarded.

Another problem encountered involves a state of superficial sleep, according to which the power supply derived from the contact interface of the object is limited (standards), whereas resources derived from both interfaces—contact interface and contactless interface—are required by the object simultaneously.

The transitions to and from this status are also involved.

It should be noted here that a sleep state is, in common practice, relative to the active statuses. Therefore in the case of a cell telephony terminal, it is not infrequent that the object is in a sleep state for 95% of the period of use of this terminal.

Up to now, in a state of superficial sleep, the only resources available are a reduced electric power supply, in addition to an external clock signal derived from the contact interface.

These limited resources do not allow processing of an application derived from the contactless interface.

This is justified to date, for example by constraints of partitioning within the same object, between the highly secured contact applications (bank, telephone, etc.) and the contactless applications.

It would therefore be appropriate to be able to have external resources available simultaneously in this case, particularly in terms of electric power. An advantage in this case would be to allow a contactless application to operate without consuming resources (power) derived from the contact interface when the standards imposed on this contact interface require this.

A problem similar to the one of the above involves disappearance of the source of the external contact clock, causing a state of deep sleep, whereas an application managed by the contactless interface has begun.

This is the case for example if the clock signal provided by the contact interface terminal disappears. This is common in practice, with the knowledge that a state of deep sleep, i.e. without external clock, is often of longer duration than that of superficial sleep mentioned above.

To date, the standards require in this case in particular that the terminal connected to the contact interface ceases to supply the clock which would be necessary for the contactless application. With many objects, it is further not possible to use the internal clock supplied by the chip independently from that of the interfaces.

Thus, for some objects, the chip requires an external reference in order to use an internal clock: this external reference is not available at present.

It would therefore be appropriate to be able to allow a contactless application to function or at least to complete itself correctly, without consuming any resources (power and/or clock) derived from the contact interface beyond those which the standards imposed on this contact interface require.

Another problem encountered involves an object possessing two interfaces or more (contact, contactless, USB, etc. . . . ) and intended for simultaneous use of at least two of these interfaces.

This problem is related to the fact that an application executed in the object is not in a position to determine which are the active interfaces and what state the latter are in (i.e.: how many and which of the interfaces provides the power supply and/or clock).

Consequently, an onboard application in the object is not currently capable of making the decisions necessary as a function of the status of the interfaces.

In such a way that this application cannot function correctly (for example, cancellation of a transaction commenced on an interface which has deactivated prematurely). This is the case in the event of separation.

For example, a present, in an object with multiple interfaces, its interfaces may be activated or deactivated, whilst an onboard application in the object is continuously executed without being interrupted.

The deactivation of one or indeed several interfaces does not mean that the object is out of operation as a result: the object is actually only out of operation when all the interfaces are deactivated.

The invention aims to compensate for these disadvantages in particular.

SUMMARY OF THE INVENTION

To this end, the aims of the invention are now explained.

One object aims at a process allowing for a simultaneous functioning of applications on at least two communication and/or supply contact and/or contactless interfaces of an intelligent portable object, the said object implementing transitions of functioning status or variations in functioning status.

The process particularity lies in that it includes a status transitions or variations control step which includes a step giving information on the status transitions or variations and/or an object configuration step, prior to the operation of a fully simultaneous functioning of applications.

Depending on the embodiments, control is performed by a resource controller and/or the processor block and/or one of its applications.

According to one embodiment, the contact interface conforms with one version of ISO 7816.

According to one embodiment, the immunity step comprises at least one phase forming supply controller, which detects the appearance and/or disappearance of resources, for instance in real time.

According to one embodiment, the phase forming supply controller generates one interruption to an interruption controller, in case of a variation in availability of at least one resource.

According to one embodiment, the phase forming supply controller is capable of generating, or not, an interruption in the course of transitions from one status to another, more particularly in case of:

transition from a state of low consumption to supply via the contactless interface: the interruption occurs if the voltage via this interface is higher than the threshold voltage;

transition from supply via the contactless interface to the cessation of this supply: the interruption occurs when the voltage received by the contactless interface is lower than the threshold voltage;

transition from supply via the contactless interface to supply via the contact interface; and the interruption occurs; and transition or reset sequence commanded by the contact interface, with the supply via the contact interface; the interruption occurs.

According to one embodiment, during a transition from supply via the contactless interface to the cessation of this supply: the interruption occurs when the voltage received by the contactless interface is lower than a threshold voltage; in the wake, the chip is placed in sleep;

According to one embodiment, the value of the critical threshold voltage is predetermined in such a way as to allow risk-free transfer of complete cessation of the supply of the chip; for example, the value of this threshold voltage is slightly higher than a minimum voltage for operation of the chip.

According to one embodiment, this process comprises at least one step of immediate warning, for fully simultaneous management of the power and/or clock resources.

According to one embodiment, the immediate warning step makes provision for a phase of change of course of the resources so that they are, at least partially, tapped via the contactless interface.

According to one embodiment, the immediate warning step makes provision for a phase of change of course of the resources so that they are, at least partially, tapped via the contactless interface.

According to one embodiment, this process makes provision for at least one step of transaction maintenance, with at least one phase of delaying and/or simulation of resetting, ordered by the contact interface during a transition aiming to reinitialise the chip card during a change in course of the resources.

According to one embodiment, a delay phase, during which the execution of instructions derived from the code selected generates, for example, a delay command by sending a single usual command byte of response to activation of reset.

According to one embodiment, a delay command with resumption of the functions occurs after a predefined number of clock cycles, e. g. around 400 to 40,000 clock cycles.

According to one embodiment, this process makes provision for at least one logical phase constituting a sleep controller so that the chip complies with low consumption constraints during sleep states;

According to one embodiment, this logical phase constituting a sleep controller, makes provision for the following from the contact interface: in states of superficial sleep, less than 200 µA may be tapped; in states of deep sleep, less than 100 µA may be tapped;

According to one embodiment, the other contactless standard is standard ISO.IEC 14443, relating to the contactless interface.

Another object of the invention concerns a fully simultaneous information device for variations in status, for an intelligent portable object having at least a dual interface and being provided with a chip; this object being capable of communicating with at least one electronic data transmission terminal via a contact and/or contactless interface; this device being such that: the terminal is connected to the object via the contact interface so as to be secured by the object in a dual interface operation status, with the contact and contactless interfaces functioning at the same time; at least one transition causing a variation in at least one status for the object;

The device particularity lies in that it includes at least chip information means which are capable of restituting status variations, with at least one functional block forming supply controller which ensures configuration/information, thus allowing for a fully simultaneous functioning, using a contact and/or a contactless interface.

According to one embodiment, the means of immunity comprise: a diode for limiting the power consumed from the contactless interface and a logical gate ensuring switching between two power consumption modes (via contact interface or via contactless interface).

According to one embodiment, the means of immunity comprise: at least one wired mechanism capable of detecting the presence of a supply resource derived from the contact interface and derived from the contactless interface, with this mechanism possessing at least two registers with the assistance of which the means of immunity give information on the status of the supply resources, such that any modification is these registers is indicated by an alert signal, for example in the form of interruption; wiring connecting the mechanism to a processor block, so that the means of immunity, after having consulted the registers subsequently select the power source used.

According to one embodiment, the means of immunity comprise a wired mechanism provided in the chip guaranteeing that the source selected supplies the chip with electricity.

According to one embodiment, the means of immunity comprise at least one functional block forming a supply controller, which detects the appearance and/or disappearance of resources.

According to one embodiment, the means of immunity comprise means of fully simultaneous management power and/or clock and/or time delay resources.

According to one embodiment, the device comprises means of immediate warning, for fully simultaneous management of the power and/or clock resources.

According to one embodiment, the means of immediate warning make provision for at least one functional block allowing change of course of resources so that they are, at least partially, channelled via the contactless interface.

According to one embodiment, the means of immediate warning make provision for at least one functional block allowing change of course of resources so that they are, at least partially, channelled via the contactless interface.

According to one embodiment, this device comprises means of maintaining transactions, with at least one element of delay and/or simulation of resetting ordered by the contact interface, during a transition intended to reinitialise the chip during a change in course of resources.

According to one embodiment, this device comprises means of immunity to variations in the supply source.

According to one embodiment, these means of immunity select the origin of supply of the chip among:
  a power origin (VCC) from the contact interface (7); and/or
  a power origin (VCC) from the antenna (4); and/or
  a power origin, through a combination of origins, i.e via a function of power origins.

According to one embodiment, this device makes provision for at least one functional block forming a supply controller, according to the statuses of the power resources.

According to one embodiment, this functional block comprises wiring or similar for supply of the chip with appropriate voltages and powers, for information of this chip on the appearance and/or disappearance of supply resources derived from the contact and/or contactless interfaces.

According to one embodiment, this device comprises a functional block forming a sleep controller, for conformation of the chip to constraints of low consumption during sleep states.

According to one embodiment, this functional block constituting a sleep controller, makes a conformation of supply from the contact interface:
  In superficial sleep states, to less than 200 μA; and in deep sleep states, to less than 100 μA.

Another subject of the invention is a transmission terminal, comprising at least one connection by galvanic contact to an intelligent portable object with a dual interface, with an interface contact allowing the object to secure this terminal.

This object is provided with a chip and is capable of communicating with the terminal via the contact interface according to standard ISO7816.3; the object being further provided with a contactless interface communicating according to another standard on a contactless basis.

This terminal is suitable for participating in the implementation of the process and/or receiving the object comprising the device mentioned above.

The terminal is composed of: a cell phone (e.g.: GSM, 3GPP, UMTS CDMA; etc.) and/or portable personal assistant (e.g.: PDA) and/or decoding box and/or computer.

Another subject of the invention involves an intelligent portable object suitable for participating in implementation of the process and/or receiving the object comprising the device and/or being connected to a terminal mentioned above.

This object has a dual interface and is equipped with a chip; this object being suitable for communicating with at least one electronic data transmission terminal via a contact interface according to standard ISO7816.3 and likewise without contact via a contactless interface and according to another contactless standard; this process making provision for the fact that: the terminal is secured by the object via the contact interface.

According to one embodiment, the object includes: A body inside which are formed a trimming outline, a breakable substrate held by at least one breakable bridge and delimited by the outline; one chip being disposed within the breakable substrate, one contactless interface connected to the chip and including an antenna extending in the body; and interface desinhibiting means having a conductor which shunts the antenna and the breaking of which makes it possible for the interface to function in a disinhibited state.

This conductor of the desinhibition means extends within at least one breakable bridge which holds the breakable substrate on the rest of the body, in such a manner that breaking it simultaneously causes the release of the substrate from the rest of the body and makes it possible for the interface to function in a disinhibited state, owing to the breaking of the conductor.

According to one embodiment, the object includes: an onboard source of power in the object, such as a solar sensor or accumulator, forming means of substitution of the energy resources derived from the contact interfaces or contactless interfaces.

According to one embodiment, the object exclusively comprises energy resources derived from the contact interfaces or contactless interfaces and is therefore devoid of an onboard energy source.

Exemplary embodiments of the invention are now explained in the description which follows and refers to the drawings.

FIG. 1 is a schematic view with a longitudinal elevation perspective, which illustrates an example of an intelligent portable object with a contactless interface according to the invention.

FIG. 2 is a schematic view with a longitudinal elevation perspective, which illustrates an example according to the invention of a terminal in the form of a portable assistant with cell communication, secured by insertion of an intelligent portable object; with connections for: input-output of data through a galvanic contact; clock (the said "Clk"); grounding (the said "Gnd"); the power supply (the said "Vcc"); input-output of external antenna; resetting (the said "MaZ").

FIG. 3 is a schematic view which illustrates the functioning of the invention, in which the object is inserted in a terminal here in the form of a cell telephone or similar, a contactless connection (e.g.: RF; NFC; BlueTooth; WiFi) being established between this object and a contactless terminal, whereas another connection (e.g.: GSM, 3GPP; UMTS; CDMA) secured via a contact interface of the object is established with a terminal, in the form of a cell phone, which is in turn connected to a network of other terminals.

FIG. 4 is a schematic view from above of a portion of circuit within the object according to the invention and connected to a terminal to be secured, with a consumed power limitation diode from the contactless interface, a logical gate guaranteeing switching between two modes of power supply (via the galvanic interface or via the contactless interface. This portion of circuit thus forms means of selection by the application and illustrates the suitable steps, without contact of external resources to be used (electric power), in case a Clock Pause (known as PauseC) mode is triggered.

FIG. 5 is a schematic view from above of a portion of circuit within the object according to the invention and connected to a terminal to be secured, with electric power excess absorption resistances from the contactless interface, logical means guaranteeing switching between two modes of power supply (via the galvanic interface or via the contactless interface). This portion of circuit forms at least a part of the external resources selection means to be used, so as to allow a contactless application to operate without consuming resources (power) derived from the contact interface 7 when the latter requires this.

DETAILED DESCRIPTION

Figure 1:
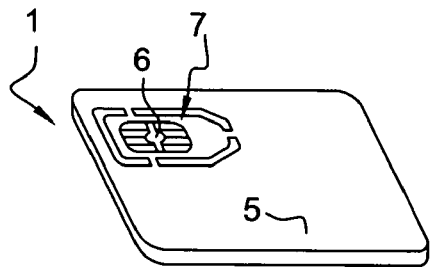

Let us begin by an account of the structures and interfaces involved.

In the figures, an intelligent portable object is referred to as 1.

Such objects 1 include for example chip cards, electronic tickets, so-called "dongle" plugs or other modules such as those of proximity communication (e.g.: NFC) or semi-proximity (e.g.: BlueTooth).

They involve secure objects which cannot be dismantled and are "portables" i.e. suitable for being placed in the pocket owing to their smaller dimensions to those of electronic data transmission terminals 2. Examples of such objects are illustrated in FIGS. 2 to 5.

These objects 1 are suitable for remote communication with one or several electronic data transmission terminals 2 and/or other objects 1, via a contactless interface 3.

This interface 3 guarantees contactless communication via an antenna 4.

Some of these terminals 2 e. g. cell telephones, are "portable", i.e. suitable for being transported fairly easily.

But are not however considered here as being genuinely "portable".

According to the exemplary embodiments of the object 1, its contactless interface 3 includes an antenna 4, at least partially:
  integrated in a module of object 1; and/or
  integrated in a module 5 of object 1; and/or
  integrated in the terminal 2 to be secured, and connected by means of a galvanic connection.

Figure 2:
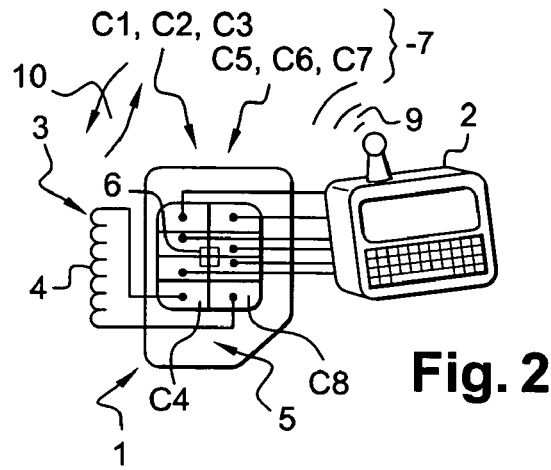
Figure 3:
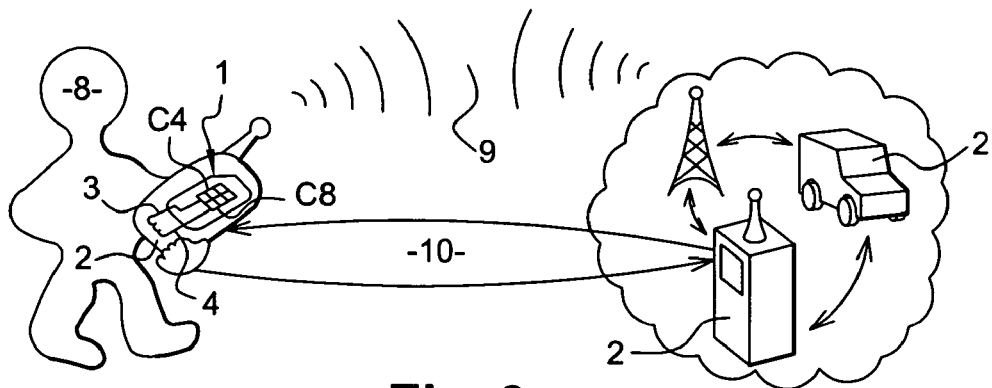

In FIGS. 1 to 3, the object 1 presents common forms of chip cards.

This object 1 comprises here: a card body 5, inside or on the surface of which a chip 6 (FIG. 1) is installed—possibly within a module—; the antenna 4 of the contactless interface 3 which is connected to the chip 6.

A galvanic contact interface 7 is also connected to the chip 6: it comprises a terminal board emerging on a main external surface of the body 5.

In FIG. 1, the body 5 presents an external shape factor as defined by standard ISO7816, in which the actual object 1 is integrated in a detachable manner.

Once the surround of the body 5 has been removed, the actual object 1 shows an external shape factor as defined by standard 3GPPTS11.11 (411 and 412) or GSM and known as "SIM".

The terminal board of the interface 7 is also defined by these standards. It has six to eight contact areas in this case (FIG. 2) C1, C2, C3, C5, C6 and C7.

If appropriate, this terminal board also comprises areas C4 and C8. However, according to standard 3GPPTS11.11 (431) for example, areas C4 and C8 are not used in the functioning of a conventional cell telephony terminal 2 known as "GSM".

These areas C4 and C8 are, according to the standards, each connected to a port of the chip 6.

In the examples, the contactless interface 3 comprises an antenna 4 integrated in the terminal 2 to be secured and connected via the galvanic link offered by areas C4 and C8 of the contact interface 7.

In FIG. 3, the antenna 4 is external to the object 1, as is apparent from FIG. 3.

It should be noted that the data signals passing through the contact areas C2 and C7 in particular are numerical so-called "digital" signals of binary type.

Whereas the data signals which pass through areas C4 and C8 in particularly or are directly transmitted to the chip 6, are modulated signals (Hertzian, for example), derived from the antenna 4.

Let us now mention the terminals 2.

These terminals 2 are for example (FIG. 3) cell telephones (e.g.: GSM, 3GPP, UMTS, CDMA, etc.), portable personal assistants (e.g.: PDA as in FIG. 2), decoding boxes and computers, particularly within networks, or indeed interactive terminals or access control equipment (transports, infrastructures, data processing equipment, etc.) They involve electronic devices which can be disassembled and which are preferably portable, i.e. easily transportable by a holder 8 for example.

All the terminals 2 according to the invention, i.e. safeguarded via the contact interface 7 by an object 1 as mentioned, are capable of remote communication with other terminals 2—for example those represented on the right in FIG. 3—remote meaning contact free.

The contactless communication of these terminals 2 secured by an object 1 is illustrated by waves and is represented in 9.

Another communication known as a transaction or application, illustrated by arrows and represented in 10, is that which involves no contact, of which object 1 is capable via its interface 3 and therefore the antenna 4.

Communication 9, also known as an application, must be distinguished from that of which object 1 is capable via its interface 3 and therefore the antenna 4.

Let us illustrate here the content of these communications 9 and 10, for example of a cell telephone terminal 2 equipped with an object 1 according to the invention.

For example, the communication 9 allows a secure purchase from the terminal 2 and from a service server such as the one illustrated at the bottom left in FIG. 2—which is in turn connected to the cell reception terminal board represented by terminal 2 at the top left. This purchase is recorded in the form of values, in the object 1.

Via the antenna 4, the communication 10 subsequently makes it possible to debit en masse the values purchased in this manner.

The functioning of these objects 1 and terminal 2 is explained below, by referring to FIG. 6 (current state of technology) and FIG. 7 (invention).

This is in order to explain how the invention renders possible the simultaneous and secure functioning within an intelligent portable object 1, of a contactless interface 3 in addition to a contact interface 7, i.e. galvanic or ohmic.

Likewise the secure function of an application 10, the data of which pass via the contactless interface 3 simultaneously to a distinct application 9, the data of which pass via contact interface 7.

These interfaces 3 and 7 are connected to the same chip 6 within the object 1 and the applications via the contactless interfaces 10 and contact 9 are process on this same chip 6.

Figure 6:
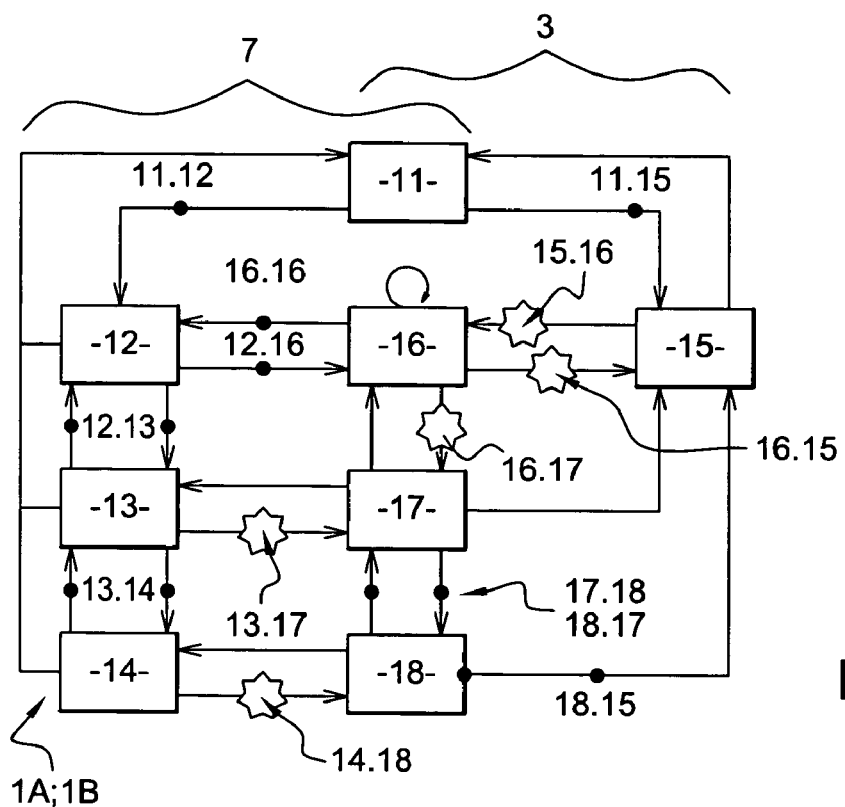
FIG. 6 is a schematic logical graph which illustrates conventional steps and transitions within the object inserted in a terminal, as observed in practice. It should be noted that (2) conventional steps are inaccessible, and that (5) conventional transitions are impossible.
Figure 7:
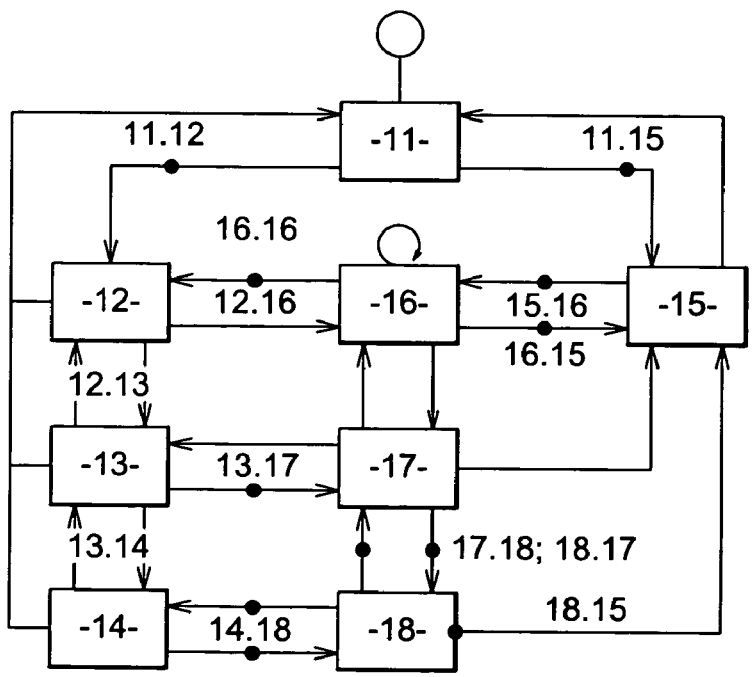
FIG. 7 is a schematic logical graph similar to that in FIG. 6, but which illustrates steps and transitions according to the invention.

A few advance definitions are useful to facilitate reading of FIGS. 6 and 7.

With regard to the chip 6 incorporated in the object 1, it manages the interfaces 3 and 7 and also processes the data of the said applications in order to simplify "contact interface" 9 and "contactless interface" 10.

The structure of this chip 6, within an integrated substrate, may be simplified as follows into functional blocks:
  memory block (referred to in 120 in FIG. 8) including in particular: a volatile memory known as "RAM" (referred to in 122 in FIG. 8), non-volatile memory known as "ROM" (referred to in 121 in FIG. 8) and re-inscriptible "EEPROM" (referred to in 123 in FIG. 8);
  communication block (in FIG. 8 refer to blocks referred to in 102 and 109); It should be noted that in FIG. 8, a data transfer bus 124—also sometimes known as input output block designated "I/O"—connects the block 120 and others including 102 and 109;
  processor block known as "CPU" (referred to in 108 in FIG. 8); this processor block 108 employs data processing, which adopts the form, according to the individual case, of an operating, application system, etc.
  a specialised processing block, e.g.: a coprocessor, a time delay (referred to in 126, in FIG. 8); etc.

In this respect also, refer to FIG. 8 and the passages referring to it below.

According to the instructions or values of the inputs outputs to the chip 6, the latter is transformed into various statuses, including:
  deactivated state known as "OFF", illustrated in 11 in the figures, such that the object 1 is not functioning (i.e. "deactivated, stopped"), without any data processing or power consumption;
  operational state known as "ON", i.e. operating (12-18), allowing management of the interfaces 3 and 7 in addition to processing of the applications (with contact 9 and contactless 10).

Not mentioned in detail here is a transient state of waking known as "IDLE", which offers a practical solution of access to dormant states expounded below.

In the tables below, resources "VCC" and "RF" are mentioned in addition to their possible statuses, which are now explained.

Beforehand, it should be noted that the resource known as "VCC" denotes the supply of electric power of the object 1, which is derived from contact interface 7.

In contrast, when electric power supply of the object 1 is derived from the contactless interface 3, it is known as "VDD" (and is therefore derived from the resource "RF").

Firstly, for the resource "Vcc", the statuses "Stop/Active" indicate whether the contact interface 7 is respectively supplied with power or otherwise. In its Active state, the contact interface 7 guarantees supply of electric power to the object 1.

In its Stop state, this contact interface 7 does not guarantee any supply of electric power.

In its "Active" status (usually called "VCC ON") the contact interface 7 at least supplies electric current to the chip 6, this chip 6 being capable of consumption within the limitations imposed which are generally sufficient for normal functioning of the object 1;

This is the case when terminal 2 obtains that an application 9 resorting to the contact interface 7 for the exchange of data and resources is processed by the object 1.

This supply "VCC" from the interface 7 is further capable of being placed in a status known as "Low Consumption", as explained below.

In the figures, statuses (13, 14, 17, 18) are known as "Low Consumption", which impose a maximum value of consumption tapped by the object 1 via its contact interface 7: A distinction is currently drawn, among the statuses of low consumption, between:
  superficial sleep (known as "LOW POWER VCC"); and
  deep sleep (known as "LOW POWER VCC with Pause C"). NB: "C" for Clock.

According to standard 3GPPTS11.11 in particular, the power consumption is imposed when it derives its resources from the contact interface 7, according to two restrictive cases:
  in deep sleep, less than—i.e. at the most—100 µA may be tapped via the contact interface 7;
  in superficial sleep, less than—i.e. at the most—200 µA may be tapped via the contact interface 7.

With the current chips 6, the constraints of low consumption are complied with during transfer to sleep status by cessation of the processing and backing up of the data necessary for subsequent resumption of this processing.

These necessary data are in particular the former context (e.g.: data, registers).

In this sleep status, at present, the chip 6 cannot process a contactless application.

Conversely, one of the aims of the invention is that once the chip 6 (depending on the executions, by logical and/or cabled means such as its "CPU" block) is dormant, it is possible to achieve an operational state in which the chip's electric power supply is in particular derived from the contactless interface 3, while observing the imposed limits of consumption on the interface 7.

Further, the chip 6 is said to be in deep sleep with Clock Pause (known as PauseC)", when this chip 6 is in a state similar to superficial sleep, but without having any clock resource derived from the contact interface 7.

Secondly, the resource "RF" indicates the status ("Stop/Active") of the contactless interface 3, which is of the Radio Frequency (RF) type in the example of standard ISO14443.

In its Active state, the contactless interface 3 guarantees a contactless transaction, i.e. remote transaction, such as:
  transmission and/or
  reception of modulated signals (data, resources) and
  processing of an application using in particular the data of these signals.

In its Stop status, this contactless interface 3 does not guarantee any transaction.

Thirdly, the status "Sleep", respectively indicates ("No/Yes") if the chip 6 is not, or is, in a state of low consumption on the contact interface 7.

Fourthly, the status "PauseC" respectively indicates ("No/Yes") if the chip 6 is not, or is supplied in external clock signs, during the status of low consumption, from the contact interface 7.

TABLE 1

(situation with a known object 1A):

|  | Initial Status | | | | Final Status | | | | | Transitions FIG. 6 & 7 | |
| --- | --- | --- | --- | --- | --- | --- | --- | --- | --- | --- | --- |
|  | Vcc | RF | Sleep | PauseC | Vcc | RF | Sleep | PauseC | 1A | From: | To: |
| Transition on RF with Vcc active | Active | Stop | No | No | Active | Active | No | No | OK | 12 | 16 |
|  | Active | Active | No | No | Active | Stop | No | No | OK | 16 | 12 |
| Transition on Vcc With RF active | Stop | Active | No | No | Active | Active | No | No | NOK | 15 | 16 |
|  | Active | Active | No | No | Stop | Active | No | No | NOK | 16 | 15 |
| PauseC ON/OFF With RF active | Active | Active | Yes | No | Active | Active | No | Yes | NOK | 17 | 18 |
|  | Active | Active | Yes | Yes | Active | Active | No | No | NOK | 18 | 17 |
| Transition on RF With PauseC | Active | Stop | Yes | Yes | Active | Active | Yes | Yes | NOK | 14 | 18 |
|  | Active | Active | Yes | Yes | Active | Stop | Yes | Yes | NOK | 18 | 14 |
| Sleep ON/OFF With RF active | Active | Active | No | No | Active | Active | Yes | No | NOK | 16 | 17 |
|  | Active | Active | Yes | No | Active | Active | No | No | NOK | 17 | 16 |
| Transition on RF with Sleep mode | Active | Stop | Yes | No | Active | Active | Yes | No | NOK | 13 | 17 |
|  | Active | Active | Yes | No | Active | Stop | Yes | No | NOK | 17 | 13 |
| Transition on Vcc With RF active & low cons. mode | Active | Active | Yes | No | Stop | Active | Yes | Yes | NOK | 17 | 15 |
|  | Active | Active | Yes | Yes | Stop | Active | Yes | Yes | NOK | 18 | 15 |

|  | Initial Status | | | | Action | | | |
| --- | --- | --- | --- | --- | --- | --- | --- | --- |
|  | Vcc | RF | Sleep | PauseC |  |  |  |  |
| Impact on Circuit reset | Active | Active | No | No | Hot reset on Vcc | NOK | 16 | 16 |

TABLE 2

(situation with known object 1B):

|  | Initial Status | | | | Final Status | | | | | Transitions FIG. 6 & 7 | |
| --- | --- | --- | --- | --- | --- | --- | --- | --- | --- | --- | --- |
|  | Vcc | RF | Sleep | PauseC | Vcc | RF | Sleep | PauseC | 1B | From: | To: |
| Transition on RF with Vcc active | Active | Stop | No | No | Active | Active | No | No | OK | 12 | 16 |
|  | Active | Active | No | No | Active | Stop | No | No | OK | 16 | 12 |
| Transition on Vcc With RF active | Stop | Active | No | No | Active | Active | No | No | NOK | 15 | 16 |
|  | Active | Active | No | No | Stop | Active | No | No | NOK | 16 | 15 |
| PauseC ON/OFF With RF active | Active | Active | Yes | No | Active | Active | No | Yes | NOK | 17 | 18 |
|  | Active | Active | Yes | Yes | Active | Active | No | No | NOK | 18 | 17 |
| Transition on RF With PauseC | Active | Stop | Yes | Yes | Active | Active | Yes | Yes | NOK | 14 | 18 |
|  | Active | Active | Yes | Yes | Active | Stop | Yes | Yes | NOK | 18 | 14 |
| Sleep ON/OFF With RF active | Active | Active | No | No | Active | Active | Yes | No | NOK | 16 | 17 |
|  | Active | Active | Yes | No | Active | Active | No | No | NOK | 17 | 16 |
| Transition on RF with Sleep mode | Active | Stop | Yes | No | Active | Active | Yes | No | NOK | 13 | 17 |
|  | Active | Active | Yes | No | Active | Stop | Yes | No | NOK | 17 | 13 |
| Transition on Vcc With RF active & low cons. mode | Active | Active | Yes | No | Stop | Active | Yes | Yes | NOK | 17 | 15 |
|  | Active | Active | Yes | Yes | Stop | Active | Yes | Yes | NOK | 18 | 15 |

|  | Initial Status | | | | Action | | | |
| --- | --- | --- | --- | --- | --- | --- | --- | --- |
|  | Vcc | RF | Sleep | PauseC |  |  |  |  |
| Impact on Circuit reset | Active | Active | No | No | Hot reset on Vcc | NOK | 16 | 16 |

Tables 1 and 2 above each illustrate the situation encountered in these states or transitions, with current objects 1 (1A and 1B).

By comparing these tables of FIG. 6, one notes, in addition to the possible statuses and transitions (denoted by: "OK"), as in FIG. 6:

two impossible states (17; 18) (denoted by: "NOK"); and
twelve impossible transitions (15.16; 16.15; 17.18; 18.17; 14.18; 18.14; 16.17; 17.16; 13.17; 17.13; 17.15; 18.15) ("NOK").

These definitions and illustrations of the known techniques having been expounded, let us now return to FIGS. 6 and 7.

In these FIGS. 6 and 7, the identical elements bear the same references and are described only once for the sake of simplicity. The left-hand column of the graphs of FIGS. 6 and 7 illustrates the statuses related to functioning of the contact interface 7, whereas the right-hand column illustrates the statuses related to functioning of the contactless interface 3.

It should be noted here that by default, when an inverse transition is not mentioned, the latter is simply a return route and does not therefore require any additional explanation.

Further, it should be noted that in FIG. 6, the (five) impossible transitions are illustrated by starred borders, whereas the (two) statuses impossible to achieve are illustrated by a hatched box.

Apart from a status 11, the middle column (statuses 16, 17 and 18) describes statuses desired for an object 1 fully used simultaneously according to the invention.

The statuses are illustrated by boxes and the transitions between these statuses—possible or impossible—are illustrated by oriented arrows.

The Deactivated status 11 corresponds in the case of a cell telephone terminal 2 to the situation according to which this terminal 2 is switched off and is unusable as is by the holder 8.

Starting from the Deactivated status 11, a transition 11.12 on FIGS. 6 and 7 makes it possible to achieve a status 12 according to which the object 1 is in operation via contact interface 7 (known as: state of operation via contact interface). This status 12 is known as "in operation via contact interface".

In the example of the cell telephone terminal 2, this usual transition 11.12 corresponds to the action of the holder 8 which switches on its terminal 2.

Here, the terminal 2 addresses a reset signal to the object 1 via the terminal board of the interface 7. The first bytes of a response protocol to the reset (known as "ATR") are subsequently addressed by the object 1 to the terminal 2 via the interface 7.

When these exchanges end positively, the object 1 is capable of processing directly orders derived from the interface 7 and derived from the terminal 2 secured by this object 1.

Starting from the status in operation via contact interface 12, a transition 12.13 makes it possible to a status 13 or waiting status with low consumption.

This means, the status 13 of superficial sleep already mentioned, in which the object 1 is awaiting a prompt from the contact interface 7.

Typically, the waiting status 13 is established when the object 1 has completed a processing operation (energy saving mode). We should remember that this status 13 imposes a reduced energy consumption by the object 1 via the interface 7.

Starting from the status 13, a transition 13.14 (FIGS. 6 and 7) makes it possible to achieve a status 14 of deep sleep with a clock pause already mentioned. In this status 14, the object 1 awaits a prompt from the contact interface 7. It is generally the terminal 2 that initiates the clock chops (CLK) between two commands. For example, a clock chop to the status 14 is imposed following "n" clock cycles (for example, around 1800 to 2000 cycles), following a command.

Let us now turn to the right column of FIGS. 6 and 7 and to the statuses and transitions linked to contactless interface 3.

From the status 11, the transition 11.15 corresponds to a case in which the antenna 4 is exposed to the field of a contactless modulated signal (e.g.: RF); this signal is a carrier of resources (energy and clock) in addition to data in the form of templates.

We have a case in which the antenna 4 is exposed to a contactless modulated field (energy and data), but in which the object 1 does not have any resources derived from the contact interface 7.

This transition 11.15 results in the status in contactless operation 15 via interface 3. In this case, the object 1 is capable of directly processing commands derived from the interface 3.

It should be noted here that on the one hand, in the objects 1, the choice of transitions is exclusive, starting from the Deactivated status 11, between the respective statuses:

in operation via contact interface (12); and
in operation via contactless interface (15).

On the other hand, for the status contactless operation 15, there is no constraint of maximum energy consumption in the standards mentioned, unlike the status in operation via contact interface 12.

The status 16 is known as dual interface operation. In the FIGS. 6 and 7, this status 16 corresponds to the situation according to which the contact interface 7 is in operation and likewise the other contactless interface 3 is in operation.

This status 16 is the only dual operation status possible at present, i.e. in which the contact interface 7 and contactless interface 3 operate at the same time.

It should be underlined that in the objects 1 available to date, only transitions 12.16 and 16.12 are possible (OK). Conversely, the transitions from the status 15 and from the new status 17 to the status 16 are impossible (NOK).

With these transitions 12.16 and 16.12, it is necessary to cause the contact interface and contactless interface (7 and 3) to exist alongside each other, in addition to the applications 9 and 10 calling upon these interfaces, respectively.

Owing in particular to the impossible transitions mentioned above, it is consequently not possible with the current interfaces and applications to speak of full and simultaneous use.

The transition 12.16 corresponds to a case—still in the example of the cell terminal 2—in which the contact interface 7 operates (resource and application 9) whereas the antenna 4 penetrates into the field detected by the contactless interface 3 (transaction 10).

Let us mention here the currently impossible transition 16.16.

The problem encountered during this transition 16.16 known as "hot reset" is to allow the chip 6 to not be genuinely reinitialised, unlike the effect currently induced by the reset signal received from the contact interface 7.

It should be noted here that the terms "hot" and "cold" are in particular defined in standard ISO7816.3.

The aim of this is to ensure that a transaction in progress via the contactless interface continues to progress normally in this case.

To this end, the invention proposes means 101 and/or steps of maintenance of the contactless transaction in progress, during setting into operation of the contact interface 7.

These means involve circuits within the chip 6 and/or logical instructions.

Within the status 16, the invention differentiates between various different cases, according to the origin of the resources consumed by the chip 6.

Currently, in status 16, this chip 6 cannot undergo any modification of some of its imperative resources—particularly power supply and clock, without undergoing an untimely reset.

With the invention, depending on the case:

The electric power supply of the chip 6 may be derived from:
- VCC i.e. from the contact interface 7;
- the antenna 4;
- a combination of origins, particularly those above, for example a function F[(VCC and/or VDD)].

The clock supplied to the chip 6 may originate from:
- the contact interface 7;
- the antenna 4;
- an internal clock generator, such as that which appears in FIG. 8 and is referred to in 113 and is described in detail below.

The invention therefore allows, within the status 16 and therefore during simultaneous processing of the applications, a change in the origin of supply and/or clock, as necessary at the time and without any risk of untimely reset.

In an embodiment of the invention, the means 101 and/or steps of maintenance of the transaction (and/or eponym state) are also known as "Fake Reset".

These means 101 and/or maintenance steps (101) make provision in particular for at least one physical element and/or logical phase of delay and/or simulation of reset, ordered by the contact interface 7 during its start-up or similar reset situations.

Figure 8:
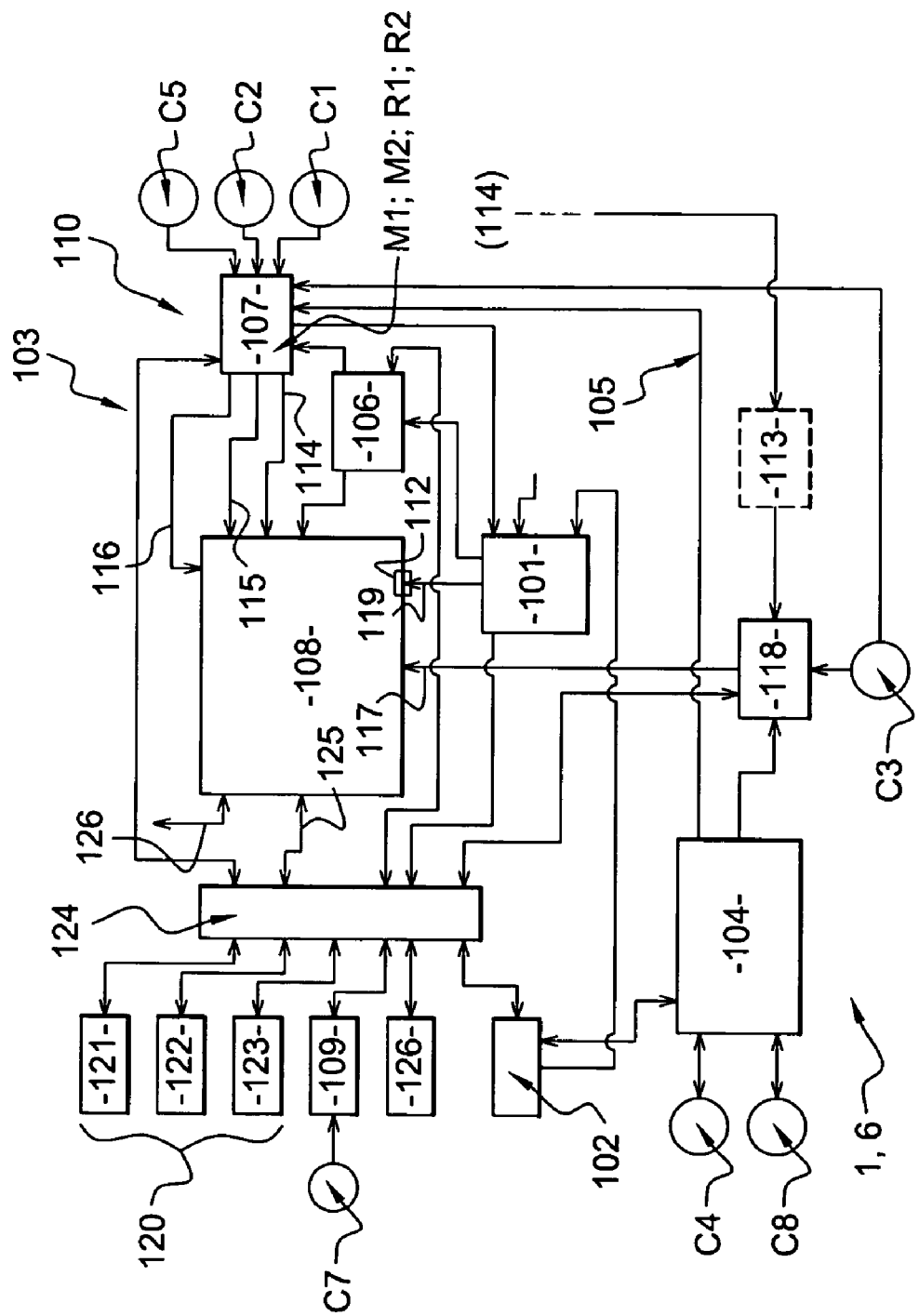
FIG. 8 is a logical diagram of the wiring and logical architecture of a chip for an intelligent portable object according to an embodiment of the invention, particularly suitable for determining which are the active interfaces and in what state the latter are.

These means 101 and/or maintenance step, include in an example at least one element and/or reset detection phase; in the example of FIG. 8 in the form of wiring capable of detecting an interruption and of generating interruption processing.

In this FIG. 8, the means of maintenance 101 are connected on input to a functional block 107 and/or and equivalent logical phase, which performs the detection in question. This block 107 is described in more detail below.

In an embodiment, a logical maintenance phase also performs a reset detection. This logical phase comprises an interruption processing routine.

It should be noted that on initial powering up of the chip 6, regardless of the source (interface 3 or 7), it must nevertheless be possible to perform a reset. This type of reset involves an actual start-up of the chip 6 and is not performed by the means 101 and/or maintenance steps.

This type of means of maintenance 101 illustrated in FIG. 8, are sometimes known as an "interruption controller block" in practice In an embodiment, at least one element and/or delaying phase of the reset instructions of the means (101) and/or maintenance step, includes a memory address zone, with a chosen code.

This memory zone receives instructions derived from the selected code, the execution of which generates—e. g. with the assistance of the resources of the means 101—according to the embodiments, commands for:

blocking of time delay via the contact interface 7, for example by sending a single usual reply command byte ("ATR") to activation of reset and/or continuation of the application resorting to the contactless interface 3; and/or maintenance in memory without deletion of the data useful for this contactless application and/or verification of the active status of the contact interface 7; and/or resumption of the functions required for the contact interface 7, for example by sending a series of response command bytes ("ATR").

For example, this resumption occurs at the end of a predetermined number of clock cycles, e. g. on the order of 400 to 40000 clock cycles.

With the current objects 1, a transition 15.16—reset—from the status 15 in operation via the contactless interface 3 to the status 16 of dual interface operation is impossible.

Indeed, currently, following such a transaction 15.16, an untimely reset is inevitable.

The same applies to an inverse transition 16.15.

This transition 15.16 is also made possible by the invention.

During the transition 15.16, the object 1 is initially in the process of processing an application in favour of the contactless interface 3 and—the object 1—is prompted by the terminal 2 via the contact interface 7.

This is the case for example for a terminal 2 forming a cell telephone (the contact application securing a telephone conversation) and in which the contactless application involves an access—transport, premises, etc.—:

It is not currently possible to begin a transaction to be secured by the object 1 via the contact interface 7, whilst an application such as access authorisation is already in progress via the contactless interface 3.

In general to date, the contactless application is abruptly aborted, since commencing an application in favour of terminal 2 via the contact interface 7 results in a reset of the chip 6.

A loss of data useful for the contactless application often results.

In order that, during such a transition 15.16, this application, in favour of the contactless interface 3, is processed simultaneously with the other application in favour of the contact interface 7 which must begin, the invention makes provision in embodiments for means 102 and/or an immediate warning step.

These means 102 and/or warning step supplement or substitute means 101 and/or the maintenance step. The means 102 and/or warning step thereby guarantee proper functioning of the chip 6 in status 16.

Further, according to the transition 16.15, the object 1 is initially prompted via the contact interface 7 for an application, in addition to simultaneously via the contactless interface 3 for another application. Currently, if the contact application now ceases, an untimely reset occurs.

In the example of the secured cell terminal 2, if the contact application currently ceases, particularly if this terminal 2 is stopped whilst the contactless access application is in progress, the latter is abruptly aborted (reset and loss of data.)

The problem of the transition 15.16 alone therefore amounts to the simultaneous management of two concurrent applications, which is guaranteed by the means 102 and/or the warning step.

Whilst the disappearance of the resources of the contact interface 7 (16.15) disturbs the current application, by causing an untimely reset. This is compensated for by the means 101 and/or maintenance steps.

Since one of the aims of the invention is to avoid untimely resets, let us provide a few concrete examples of advantages derived from this.

To date, the status 16 in dual interface operation is exclusively attainable via the transition 12.16.

For this sole transition 12.16 possible to the status 16—and for the inverse transition (to the status 12)—a message must be transmitted to the application (respectively 10 and 9 for inverse).

The impossible transition 15.16 means that in the example of a cell terminal 2, it is therefore impossible to set this terminal 2 into operation whilst a transaction 10 is in progress via the contactless interface 3.

One illustration is the purchase of a transport ticket performed via the contactless interface 3

At this point, if the holder 8 sets the latter's terminal 2 into operation in order to have a telephone communication 9, there is a risk in this case of losing the data of the transaction 10 in progress via the contactless interface 3 and of causing inconvenience to the holder 8 (access to the means of transport refused or delayed).

Indeed, in the current objects 1, the chip 6 causes the reset as soon as a transition to an "Active" or "Stop" status of the "VCC" supply via the contact interface 7 occurs.

The other impossible transition 16.15 corresponds—example of the cell terminal 2—to a case in which once the status 16 of dual interface operation has been reached from the status 12, the supply of this terminal 2 (batteries, accumulators, chargers, sensors, etc.) is interrupted during a transaction 10 via the interface 3.

In this case too, the transaction via the contactless interface 3 is abruptly interrupted, with the common risks in this case (loss of data, inconvenience, etc.)

It will be seen that the solutions proposed by the invention for both of the transitions 15.16 and 16.15 avoid any abrupt interruption of the transaction in progress via the contactless interface 3.

With regard to the transition 15.16, this avoidance is obtained for example by sending, via the means 102 and/or the warning step, to the operating system in charge of management of this transaction (=application 9 and/or 10), of a warning signal concerning this transition.

The operating system informed in this manner is capable of performing this transition 15.16 while preserving the communications, data, etc.

According to the cases, this transition 15.16 resorts to: "actual" interruption of either of the applications 9 or 10; pause on either of these applications 9 or 10; delayed to-and-fro between either of these applications 9 or 10, etc.

In an embodiment, the means 102 and/or warning steps allow the contactless application to perform a backup of the essential data (i.e.: those necessary for a subsequent resumption). This type of saving operation is often called a "backup".

In examples, in order to authorise the transition 15.16, the invention makes provision for initiation of a pause of the contactless transaction 10 and the issue of a message to the application 9 in order to indicate to the latter that the contact interface 7 is active. The application 9 subsequently processes the data derived from this contact interface 7.

Any untimely reset is inhibited and subsequently a request for share of the resources (particularly treatment) as soon as possible between the two applications 9 and 10 present (initial contact application and transaction without returning contact), is sent.

The transition 16.15 according to the invention makes provision (via means and/or steps) for an element and/or deviation phase of the resources in order for the latter to be tapped via the contactless interface 3.

Further, means of immediate warning 102 take the form of a functional block sometimes known as "UART" in FIG. 8.

These means 102 represent the serial communication peripherals complying with standard ISO7816 for the contact interface 7, in addition to a standard such as ISO14443 for the contactless interface 3.

On exit from the means 102 and/or logical immediate warning step 102, interruptions are generated particularly when a reception buffer memory known as the "buffer" is considered saturated.

This means that a protocol template has been correctly received and can be processed by an operating system of the chip 6.

This particularly allows the application resorting to the contact interface 7 to perform certain processing operations without being disturbed by the reception of data. These interruptions indicate to the application that data are available for processing.

In the example of arrival of a contactless template, the means 102 and/or warning step comprise/operate at least one initialisation element/phase which includes:

detection of a contactless source followed by detection of data derived from demodulation;

anti-collision;

Within a modulator—demodulator (MODEM), a contactless source is transformed in binary form, an initialisation is subsequently performed and anti-collision processing is performed for example; and once the template is considered as correctly received and the preceding steps have been performed normally, the usual processing operations are authorised.

In FIG. 8, a functional block 104 groups together the modulator—demodulator (MODEM) and anti-collision processing elements. It is seen in this example that the block 104 is connected via the contact areas C4 and C8.

Let us now mention a status 17 of detection of a pending field, illustrated in FIGS. 6 et 7.

This status 17 is impossible to achieve (particularly from the statuses 13 and 16) with a current object 1.

This status 17 is often achieved by means of the invention from status 13 of superficial sleep. In this status 17 close to that of superficial sleep, the supply of power derived from the contact interface 7 is limited, whilst simultaneously, resources derived from the contactless interface 3 are required by the object 1.

In order to illustrate this status 17, let us return to the example of the terminal 2 in the form of a cell telephone secured by an object 1, the contactless interface 3 of which is capable of processing so-called contactless applications.

This status 17 appears when an application is operated for the contactless interface 3, whilst the electric power supply of the object 1 from its contact interface 7 is limited.

In this status 17, the contact application awaits a command derived from the terminal 2, within the context of the transaction in progress.

In order words, it is a matter of processing an application via the contactless interface 3 whereas the object 1 is on the side of its contact interface 7, in superficial sleep. In this case, the electric power supply of the object 1 via the contact interface 7 becomes contrary to the constraints, particularly the prescriptive constraints.

In an ideal situation, the invention allows, in the status 17, a contactless application to function without consuming resources (power) derived from the contact interface 7, when the standards imposed on this interface 7 require this.

With the invention, the object 1 obtains its power supply from the contactless interface 3, by rectifying the modulated signal picked up by the antenna 4. Indeed, it has been seen that the existing standards oppose use of the power from the interface 7—and therefore the terminal 2—in certain cases including those which follow.

In order for the object 1 to be able to draw its electric power supply from the contactless interface 3, an embodiment of the invention makes provision for steps and/or means 103 of immunity to variations in the source of supply.

Figure 4:
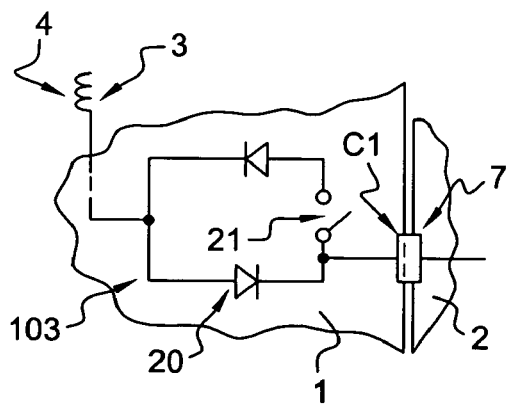

In FIG. 4, a part of the circuit within an object 1 according to the invention is shown, connected to a terminal 2 to be secured. The means 103 and/or steps of immunity to variations in the source of supply comprise, according to this embodiment, such a part of the circuit, including:

a diode 20 for limiting the power consumed from the contactless interface 3 and a logical gate 21 ensuring switching between two modes of power consumption (via contact interface 7 or via contactless interface 3).

This embodiment of the means 103 and/or immunity steps thus allows selection by the operating system of the external resources to be used (electric power) in the status 17 compatible with superficial sleep.

Typically, the means 103 and/or immunity steps select, according to the invention, the origin of the supply of the chip 6 among the:

VCC i.e. from the contact interface 7;

the antenna 4;

a combination of origins, particularly those above, for example a function F[(VCC and/or VDD)].

In another embodiment, the means 103 of immunity are provided with a wired mechanism (known below as M1—refer to FIG. 8) which allows detection of the presence of a power supply derived from the contact interface 7 (Vcc) and a power supply derived from the contactless interface 3 (Vdd).

By using this mechanism (M1), the state (refer to tables 1A and 1B: Active/Stop) of the supplies (Vcc et Vdd) is indicted with the assistance of two registers (known below as R1 and R2—refer to FIG. 8).

Any modification in the registers R1 and/or R2 (i.e. appearance of disappearance of one and/or the other of the supplies known as Vcc or Vdd) is indicated by an alert signal (in the form of interruption for example).

The operating system of the chip 6, after having consulted the registers R1 and R2, or after having been warned of a change of status of one of these two registers (interruption), subsequently selects the source of power used (Vcc or Vdd).

Another wired mechanism (known below as M2—refer to FIG. 8) is provided in the chip 6. This wired mechanism (M2) guarantees that the sole source selected is used to supply electricity to the chip 6.

If this is applied, in the case of the transition 13.17 for example, the following is obtained e. g.:

setting in to operation of the contactless interface 3, while the chip 6 was in a state of superficial sleep (13) on the side of its contact interface 7; and means 103 (mechanism M1) which detect the field or contactless template (RF), alert the chip 6 by an interruption and update the registers (R1 et R2); and the operating system, warned by the interruption issued by the means 103 and/or equivalent logical step, performs a deviation of the supply of the chip 6 to the contactless interface 3 (by means of M2), thereby guaranteeing acceptable consumption on the side of the contact interface 7; and processing of the transaction via the contactless interface 3 (RF) may then be performed, whilst the chip 6 remains in superficial sleep mode on the side of the contact interface 7.

Another embodiment of the means 103 of immunity, illustrated in FIG. 8, is now presented.

Here, the means 103 comprise a functional block 107 and/or a logical phase, known in this case as a power supply controller or "PWR" and another functional block 106 and/or an equivalent logical phase, which forms a sleep controller.

The mechanisms M1 and M2, in addition to the registers R1 and R2—and/or the equivalent logical steps—correspond functionally in the embodiments of the invention to this block 107.

To the block 107 of the means 103, the following contact areas are connected here at the input:

C1 (VCC: supply from the contact interface 7);

C2 (RST: reset;

C3 (CLK: clock from the contact interface 7); and

C5 (GND: grounding via the contact interface 7);

The function of this supply controller block 107 of the means 103 is to supply the chip 6 with appropriate voltages and power and in addition to inform the chip 6 of the appearance and/or disappearance of supply resources derived from the contact interface 7 or contactless interface 3.

For this purpose, the inputs mentioned allow the means 103 to receive on the one hand a voltage originating from the contact interface 7 via the area C1 (Vcc). On the other hand, these inputs allow, via a wiring 105, conveyance of a voltage (Vdd) derived from the modulator—demodulator of the means 104, from the contactless interface 3.

On input of the means 103, the external clock signals (CLK) and the reset request signals (RST) are received in order to detect the reset sequences in accordance with the constraints imposed by the standards owing to the use of the contact interface 7.

For example, these inputs of the means 103 take the form, in terms of the signal, of a temporal combination of voltage derived from the contact interface 7 (Vcc), the digital clock signal (CLK) and the digital reset signal (RST).

This block 107 (PWR) further contains at least one configuration/information register (in this embodiment the registers R1 and R2, FIG. 8) allowing the application executed by the processor block 108 (CPU) of the chip 6, to which the block 107 is connected to:

tell which source of voltage is available (via 3 and/or 7)

select the source (via 3 and/or 7) to be used in a given situation for supply of the chip 6 (i.e. via 3 or 7 or mixed).

The block 107 and/or phase forming the supply controller of the means 103, as illustrated, also possesses outputs.

During normal functioning, the block 107 has a status such that at least one external source of voltage (via 3 and/or 7) is present, this block 107 supplies the entire chip with appropriate voltage, generated from one of the input voltages (or a mixture of the two) (via 3 and/or 7) according to the selected configuration.

The appearance or the disappearance of sources of voltage (via 3 and/or 7) does not result in any disturbance in the output voltage, provided that at least one available voltage, or indeed a mixture of the two voltages, is sufficient.

Therefore, the block 107 and/or phase forming the supply controller does not generate any reset signal destined for the block 108 (CPU) for as long as this condition applies.

Naturally, unless provision is made for an onboard source of energy in the object 1 such as a solar sensor or accumulator, if both sources (via 3 and/or 7) disappear, the chip is no longer supplied.

It should be noted that the block 107 and/or phase forming the supply controller provides warnings in embodiments, indicating the appearance of a supply derived from the contactless interface 3.

The operating system being warned in this manner, it triggers initialisation of the contactless transaction by the functional block 104 and/or equivalent logical phases. Subsequently, this operating system resumes processing of the contact application.

This initialisation sequence is processed as a background task without disturbing the contact application. Once it is completed and the contactless template has been completely received, the means 102 and/or logical warning step informs the operating system that data to be processed are available for the contactless application.

Further, the block 107 generates an interruption to the block 101 which performs the function in this case of an interruption controller when the status of availability of the sources (via 3 and/or 7) changes and more specifically according to the following transitions:

Supply via the contact interface 7: transition 16.15 of Active to Stop: it is only meaningful if the chip 6 is still supplied via the interface 3.

Supply via the contactless interface 3: transition 13.17 or 14.18 from Stop to Active: the interruption only occurs if the voltage via the contactless interface 3 is greater than a threshold voltage. For example, the value of this threshold voltage is slightly greater than a minimum operating voltage of the chip 6 sometimes known as "POR".

Supply via the contactless interface 3: transition 17.13 or 18.14 from Active to Stop: the interruption occurs when the voltage received by the contactless interface 3 is less than a threshold voltage.

For example, the value of the critical voltage is predetermined in order to ensure transfer—as rapidly as possible wand without any risk of complete cessation, of the contactless supply (i.e. via 3)—from the supply derived from the contactless interface 3 to that which is derived from the contact interface 7.

As a direct consequence, the chip 6 is placed in sleep mode.

It should be noted here that disconnection and therefore disappearance of the source of energy derived from the contactless interface 3, is not instantaneous but gradual.

In other words, early warning signs of disconnection are easily perceptible by the object 1. In the example, during disconnection a reduction in the available voltage via the antenna 4 is initially observed, within the threshold voltage. A certain time necessarily elapses before the power derived from the antenna becomes less than or equal to the minimum operating voltage of the chip 6.

Nevertheless, if the period of time proves insufficient in order to ensure a deviation of origin of the resources by the operating system (in an embodiment via the means 103 and/or selection steps), it is the means 106 and/or sleep control steps that take over.

For example, in this situation, the means 103 and/or selection steps take charge of the deviation and avoid the object 1 from being total deprived of power resources, which would cause an untimely reset.

To this end, this transfer should be performed more rapidly than the disconnection—having cause the transition 17.13 or 18.14 from Active to Stop—of the source of energy derived from the contactless interface 3.

Means (wiring) and/or steps (logic) controlling supply such as the block 107 guarantee this transfer or deviation in the embodiments of the invention.

Let us return to the statuses and more specifically to the transitions according to which the means 103 and/or selection steps act:

Supply via the contact interface 7: transition 15.16 from Stop to Active: only if the object 1 and therefore the chip 6 are already supplied via the contactless interface 3.

A transition (16.16) or reset sequence commanded by the contact interface 7, with supply via the contact interface 7, in hot mode.

With regard to the applications via the contact interface 7 and contactless interface 3, the interruption generation signals to the block 101 by the block 107 allow the following:

When signals derived from the contactless interface 3 are being processed, observance that the contact interface 7 is requesting processing and a decision to send the first bytes of a response message to a request for reset (ATR).

An alternative would be to have the terminal 2 issue to object 1 a high level command in a package, exchanged between two applications, known as "A.P.D.U." (meaning "Application Protocol Data Unit"; according to standard ISO7618).

When the contact interface 7 is being processed, observance that the contactless interface 3 is requesting processing and a decision to launch the initialisation sequence of the protocol without suitable contact.

When both the contact interface 7 and the contactless interface 3 are functioning separately, observance of the loss of supply to one of these interfaces 7 or 3 (a situation known as "semi-disconnection").

When the contact interface 7 is in a state of superficial—or even deep sleep—, guarantee of the transition 17.13 or 18.14 so that the contact interface 7 is in sleep mode, when the supply via the antenna 4 disappears.

In order to ensure proper setting into operation of the chip 6 and its processor block 108, when this block 108 receives an initial source of energy supply—from one of the two interfaces 7 or 3—(transfer for the chip 6 from a sleep state to one of the "Active" statuses), the means 103 and/or logical steps of supply control—for example the block 107 in particular—send an initialisation signal to the reset connector of the block 108 (CPU).

This makes it possible to bring about its implementation, particularly by powering up from the predetermined source via the means 103.

Conversely, under certain circumstances, it appears preferably that the means 103 perform an inhibition of resetting.

In this manner, a digital signal originating from the contact area C2 (RST) is, in the example in FIG. 8, picked up by the controlling means and/or steps—the block 107 in the embodiment in FIG. 8—since a link is provided to these means and/or steps. In FIG. 8, this link is wired.

In this manner, a reset request sequence derived from the contact interface 7 (cold or hot reset) causes an interruption to the interruption controller block 101, in the same manner as any other peripheral.

An application, the data of which call upon the contact interface 7 may thus use this signal in order to determine whether or not it needs to send a response message to a reset request (ATR) via a universal transmission block—asynchronous reception 109 dedicated to the contact interface 7 and to which the contact area C7 is connected.

It should be noted here that in the embodiment in FIG. 8, the means 102—and/or suitable steps—of immediate warning comprise another universal transmission block—asynchronous reception, but dedicated for its part to the contactless interface 3.

As an option in implementation, the means 103 also receive on input a signal originating from a functional block 106, forming a sleep controller sometimes known as "SLEEP CTRL". In an embodiment, logical phases also form a sleep controller, at least in part.

This block 106 connected on input to the means 103, participates if necessary in the selection of the source of voltage.

If necessary, the functional block 106 oversteps an attempt to select the electrical source performed by a configuration register, as explained.

In this case, the selection logic is shifted to this sleep controller block, which subsequently forms part of the means 103 of immunity.

Let us now describe the transition 13.17. The transitions 16.17 to the status 17, in addition to 17.13, 17.15 and 17.16 from this status 17 are described below.

A transition 13.17 corresponds to the situation in which the terminal 2 is in waiting status 13, the antenna 4 being called upon in this case by a contactless field to be processed via the suitable interface 3.

The transition 16.17 corresponds initially to the example in which the terminal 2 is already in dual interface operation 16, the antenna 4 being in the process of processing an application via the contactless interface 3, whereas the contact interface 7 is prompted.

In this case, the object 1 is commanded to limit the resources that it consumes from the contact interface 7.

Resources are required to guarantee this status 17 of a pending field: particularly the energy in addition to the resources (clock, input and output data etc.), used by the interface 3 and the contactless application.

The aim in this case is therefore to render possible processing calling upon the contactless interface 3 whilst the terminal 2 imposes superficial sleep.

To date, the situation is as follows in such a case.

In such a situation, a current object 1 performs a transition 16.13 which ceases the contactless application (via 3), but such a transition (16.13) is not used in practice.

In fact, currently, one remains in status 16 with the knowledge that the limits on the resources imposed in this case (energy, clock, etc.) of the terminal 2 via the contact interface 7 are exceeded.

Consequently, in the case known above:
the standard is not complied with and the object 1 is incompatible;
the manufacturers of the terminals 2 see their resources consumed, with no return on investment, tapped on their equipment (2);
the telecommunications operators and other service providers secured by the object 1 via the interface 7, see their passband business opportunities (advertising, main service consumption, etc.) used, without return on investment and tapped on their networks and
the carrier 8 is displeased since the resources of the latter's terminal 2 (batteries, etc.) which are tapped thereby reduce the independence in terms of electric power of this terminal in particular (2).

The transition 17.16 is the opposite of that mentioned above. Indeed, the steps and/or means implemented in order to guarantee this in the embodiment of the invention are similar to those of the step 16.17, except that the electrical resources are made available via the contact interface 7.

Let us now describe the transitions 17.13 and 17.15. In fact, the steps and/or means implemented in order to guarantee this in the embodiments of the invention are similar to those of the inverse step 13.17.

Let us mention here FIG. 4, which shows an embodiment of the invention in which the means 103 comprise a part of the circuit within an object 1 according to the invention, connected by an area Cl of the interface 7, to a terminal 2 to be secured. In order to be capable of performing a selection by the contactless application 10 of the resources to be used (electric power) in the event of triggering of a "PauseC" mode, provision is made for a consumed power limitation diode 20 from the contactless interface 3 (antenna 4).

Further, these means 103 comprise a functional data processing block 21 ensuring switching between two power consumption modes:
via the galvanic interface 7; or
via the contactless interface 3.

Figure 5:
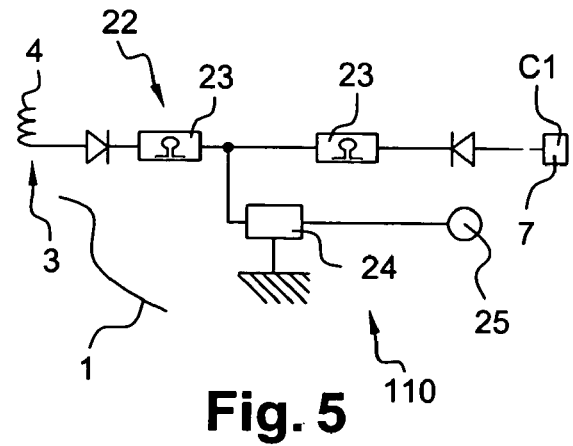

In FIG. 5, another part of the circuit of the means 103 within an object 1 according to the invention can be seen, which is also connected to a terminal 2 to be secured.

This other part of the circuit forms elements 22 of immunity of the object 1 to modifications (transitions to the status 17) of origin of the power.

These elements 22 of immunity comprise absorption resistances 23 of surplus electric power.

The elements 22 further possess logical means 24 of switching, guaranteeing selection between two power consumption modes (via galvanic interface 7 or via contactless interface 3), depending on values of results illustrating these consumptions in addition to their progress.

The elements 22 perform a selection of the resources to be used, which allow a contactless application 10 to operate without consuming resources (power) derived from the contact interface 7 when the latter requires this, while supplying to the chip 6 the resources necessary via a "contactless" input supply contact 25.

Let us now describe a status 18 known as field pick up in deep sleep. This status 18 is close to the status 17 and is shown in FIG. 6.

In this status 18, following the example of status 17, the contact application awaits a command derived from the terminal 2, within the context of the current transaction.

The status 18 is derived from the imagination for the purposes of the invention, from the other impossible status 17.

The problem to be solved in this case is similar to the preceding problem, since it aims to support the disappearance of the clock source resulting in a state of deep sleep, whilst an application resorting to the contactless interface has begun.

Such is the case if the clock supplied by the contactless interface 3 disappears, whilst a transition imposes on the contact interface 7 a state of deep sleep with a clock pause.

To date, the standards impose in this case in particular that the terminal 2 connected to the contact interface 7 ceases to supply the clock which would be necessary for the contactless application.

With a number of objects 1, it is not possible in addition to use the internal clock provided by the chip 6 independently from that of the interfaces (3 or 7). Therefore, for certain objects 1, the chip 6 still needs an external clock reference.

The invention aims to allow a contactless application to operate without consuming any resources (e.g.: clock and/or power) derived from the contact interface 7 when the standards imposed on this contact interface 7 require this.

Here, the problem is therefore management of the clock stops (PauseC in tables 1A and 1B above) as a function of the appearances (transition 18.17) and disappearances (transition 17.18) of this clock resource derived from the contact interface 7.

As long as clock resources derived from the contact interface 7 or derived from the contactless interface 3 are present, a current object 1 may process an application 9 or 10 without any risk of loss of data.

However, in case of disappearance of these clock resources and unless "internal" clock resources are available, i.e. a change of status (Yes to No/No to Yes) of the "PauseC" in the tables above, the risks of untimely reset are present and result in unacceptable situations (see above).

It should be noted that in FIG. 8, the position of an internal clock 113 is indicated at 113, connected here to supply wiring 114.

Currently, one should distinguish between two cases related to the structures of the objects 1 (and chip 6), which either allow generation of an "internal" clock or do not allow this—in the sense that systematically, the clock must be supplied by a contact interface 7 or contactless interface 3.

Some current objects 1 are not however affected by this; use of the "internal" clock resources, a clock signal generated by the chip 6 as a function of a simple electric power supply is imposed on the object 1 for as long as these resources are available.

For other objects 1 according to the invention, means 110 and/or equivalent logical steps of clock control make it possible to achieve the status 18.

These means 110 (and/or logical steps) of clock control according to the invention systematically resort in the embodiments (i.e. regardless of the transition) to clock resources derived from the contactless interface 3, in order to process a contactless application 10.

With the invention, the transition 14.18 corresponds—example of the cell terminal—to arrival of a field picked up by the antenna 4, when the object is in the status "LOW POWER with PauseC" 14.

In this case, the aim is to save the energy made available by the contact interface 7, since currently the chip 6 is completely awakened (to the status 12) in order to achieve dual interfacing.

A solution used by the invention (means 110 and/or logical steps of clock control) makes provision for forcing the object 1 to seek its supply on the side of the contactless interface 3.

However, only in order to allow it to receive the signal derived from the antenna 4. However, the object 1 capable of receiving the antenna signal 4 is maintained further in status 18 of low consumption, without a clock.

Starting from the status 18 to the status 14 (transition 18.14), a solution of the invention (means 110 and/or logical states of clock control) makes provision—for example via wired means—for observing variations in power supplied by the antenna 4 of interface 3.

This observation is a discriminating parameter and step—and advance warning—of the transition 18.14. It is therefore understandable that the means 103 and 110 have points in common.

One should once again remember that during a disconnection on the side of the contactless interface 3, moving the antenna 4 away from the coupler from which it receives the temples results in a fairly progressive reduction in the voltage on the contactless interface 3. Therefore, a period of time which is short but sufficient in the majority of cases is available in order to avoid dysfunctions.

According to the invention, if the value measured by the means 103 or 110 is equal to or less than a threshold voltage value, a flag signal indicating this parameter is addressed to the operating system. In this case, the following is caused according to the clock control steps and/or via means 110:

transfer into a state of deep sleep (according to the embodiments, by cabling and/or application).

Let us mention here the direct transition 18.15 between the statuses in operation via interface 3 without contact 15 on the one hand and pick up of the field in deep sleep 18 on the other hand.

This transition 18.15 corresponds, in the example of the cell terminal 2, to a case in which 2 is initially deactivated—i.e.: switched off or not operating—whilst a contactless transaction 10 is in progress.

Currently, the status 18 and therefore any transition involving it is impossible—inaccessible—.

The invention therefore meets a need for clock deviation in order to avoid being faced with the constraint of a forced reset.

In the case of an object 1 possessing two interfaces or more (contact, contactless, USB, etc. . . . ) and intended for simultaneous use of at least two of these interfaces, another problem appears.

This problem is related to the fact that an application executed in the object 1 is not capable of determining in real time which are the active interfaces and in what state the latter are (i.e.: how many and which of the interfaces provides the power supply and/or clock).

Consequently, an onboard application in the object 1 is not currently capable of making the necessary decisions as a function of the status of the interfaces 3 or 7.

In such a way that this application cannot function correctly. For example, there is thus a risk of not noticing the disconnection and therefore that the contactless application in progress is not interrupted correctly following cancellation of a transaction begun on a contactless interface 3 which has been prematurely deactivated.

For example, currently in an object with multiple interfaces, its interfaces 3 or 7 for example may be activated or deactivated, whilst an onboard application in the object 1 is continuously executed without being interrupted. The deactivation of one or indeed several interfaces does not as a result mean that the object 1 is not operational: the object 1 is in reality only non-operational when all the interfaces 3, 7 or others are deactivated.

In order to solve these problems, the invention proposes means 111 and/or continuous management steps of the applications.

These means 111 and/or continuous management steps have points in common with the means 101 and/or maintenance steps of the contactless transaction in progress.

In FIG. 8, this is the case of the block of the means 101 which is known as the interruption controller. This is a functional block which centralises the interruption signal originating from several peripherals.

This block indicates the arrival of an interruption at block 108 (CPU) by means of an interruption input contact 112. The controller block also has an information/configuration register which allows the block 108 to:

know which peripheral has generated an interruption and/or activate and/or deactivate the interruptions generated by a given peripheral (masking of interruption).

Let us mention here a few examples of interruption signals, in accordance with the continuous management steps and/or generated by the eponymous means 111:

derived from the supply management block 107 (PWR), an interruption signal indicates the appearance or the disappearance of a voltage source. This allows an application executed in the block 108 to know the status of the interfaces 3 and 7 at the physical level when a signal carried by wiring is involved.

derived from block 107 also, an interruption signal indicates an ISO reset sequence on the contact interface side.

derived from block 102 and specifically from its universal transmission block—asynchronous reception dedicated to the contactless interface 3, an interruption signal indicates complete acquisition of a contactless template, the anti-collision sequence being performed successfully, for example materially by this block 102 and/or as a background task.

Derived from universal transition block 109—asynchronous reception devoted to the contact interface 7, an interruption signal indicates that a sequence of bytes derived from this interface 7 is correctly acquired (the size of which is determined as being equal to: 1 to "n" : i.e. the number of bytes of this sequence).

Let us describe more in detail embodiment of the processor block 108 according to FIG. 8.

This block 108 operates within the chip 6 and therefore the object 1, the actual data processing. In FIG. 8, this block receives on input, among others:

an electric current supply (via voltage supply wiring 114 and earth 115); and interruption signals (via interruption wiring 119 connected to contact 112 and connecting the blocks 108 and 101); and the clock signal via clock input wiring 117 itself connected to a clock control block 118—described below—; and reset signals via wiring 116; and data via wiring 125, connected in turn to the block 124.

This block 108 exchanges data with the peripherals via the block 124 forming a bus, whilst wiring 126 connected to the block 108 ensures the inputs-outputs of addresses which allows selection of the peripheral for which the exchange of data on the bus 124 takes place.

Further, the block 108 (CPU) executes the actual contact and/or contactless application (9/10), comprising series of instructions stored in memories of the block 120 (in FIG. 8: RAM 122; ROM 121 and EEPROM 123).

The block 108 is said to be in sleep mode when it is supplied with electric power, but when execution of the contact and/or contactless application (9/10) is set to pause (with its context saved), which allows consumption of few resources (particularly electrical resources).

It has been seen that steps and/or means 103 of immunity to variations in the power supply source, comprising a block 107 have been described in relation with FIG. 8.

Within the means of immunity 103, the functional block 104 comprises the modulator—demodulator and anti-collision processing elements. This block serves in particular to convert the radio frequencies received by the antenna 4 here via the contacts C4 and C8 in:

voltage intended for block 107.

clock signal intended for block 118.

data intended for universal transmission block 102—asynchronous reception devoted to the contactless interface 3.

Anti-collision steps specific to the type of contactless transmission picked up by the antenna 4 are provided for here, transparently, as a background task, without disturbing the functioning of the processing block 108.

The clock control block 118 has been mentioned above. The aim of this block 118 is to supply an appropriate clock signal to the block 108 (CPU) and to the peripherals requiring it. This block 118 receives on input:

the clock signal available on contact C3 (CLK);

the clock signal derived from the block 104 which includes the modulator/demodulator;

if appropriate, a signal of an internal clock block 113. This internal clock must be generated by means of the voltage supplied by the supply controller block 107. In some embodiments, such a block 113 facilitates implementation when it is useful to have a clock signal independent from any external time delay resource.

This clock control block 118 has a configuration/information register allowing the application processed by the processor block 108 to choose the physical source of the clock supplied to this block 108, or to choose an automatic mode.

A common embodiment of the invention is as follows: selection of the clock source is made automatically by the block 118, so that the chip 6 is always delayed by a clock signal.

The invention also makes provision for means and/or steps of time delay.

Typically, the choice of the time delay source is performed by wiring and/or logical phases derived from the operating system. For example, it is necessary both for contact and contactless applications to have a source of time delay available in order to testify to the activity of the object 1 with regard to the terminal 2 (confirmation of presence).

In an embodiment of the invention, the time delay source is exclusively:

internal (e. g. in the form of a locking phase loop known as "PLL") to the object 1, particularly its chip 6;

derived from the contactless interface 3;

derived from the contact interface 7.

In FIG. 8, one sees for example means of choosing the source of time delay provided for within block 126. These means of choosing the source of time delay receive for this purpose wiring and/or input signals from:

the chip 6 and internal (e. g. derived from the block 118 or 113);

contactless and internal (derived from the means 104);

to contact and external (derived from the contact area C3).

The block 118 constantly provides that which is required, a clock signal to the chip 6 (except in deep sleep for energy saving reasons).

This now leads to mention of the block 106 sometimes known as "SLEEP CTRL", which manages the input and/or output steps in sleep status.

In the embodiment in FIG. 8, the function of this block 106 is to guarantee compliance with the standards imposed on the contact interface 7, in the example of the cell terminal, the telephony standards.

Thus, with regard to limitation of electric power consumption and support of the "PauseC".

In FIG. 8, this block 106 has on input in particular wiring derived from interruption controller block 101 (in order to receive the signal indicating the event which conditions the wakening of the processor block 108).

On output, this block 106 has in particular:

cabling derived from the block 101 via which the waking signals of the processor block 108 pass;

wiring derived from the block 107 by which the electric power supply sources of the chip 6 are forced, only in some embodiments.

This block 106 also has an information/configuration register which allows the application processed by the block 108 to select the event allowing wakening of this block 108 (e. g. during a step of arrival of a byte in the block 109 and/or appearance of a template via the antenna 4).

In one embodiment, the invention also provides for means and/or selection step of an operating mode in progress on the side of the contact interface 7.

Using these means and/or selection step, the application determines which is the current maximum consumption authorised from the contact interface 7.

These means and/or selection phase of an operating mode in progress select the source of supply of the chip 6, in terms of electric power and/or clock. Subsequently, these means and/or selection phase of an operating mode set the chip 6 to sleep mode.

An implementation of the invention makes provision (status 13 or 14) for operation known as "normal".

In this case, a transaction via the contact interface 7 alone is in progress, but the terminal 2 has not sent any command.

The chip 6 is therefore in a waiting phase and in order to fulfill the constraints of power consumption limitation, the application, by using a dedicated instruction of the block 108, causes the latter to transfer to sleep mode.

On the arrival of a new command (i.e. activity is detected at the input of block 109), the block 108 is awakened by this block 106 and the application resumes.

If, while the block 108 is in sleep mode, a contactless transaction prompts the interface 3 and initiates, the block 108 is awakened by this block 106 in order to process this transaction, without however consuming any energy or requiring a clock on the side of the contact interface 7.

As an option, this block 106 therefore informs the block 107 that it must supply itself with energy via the bloc 104 and subsequently wakes the block 108.

The other alternative route is that this block 106 initially wakes the block 108; the application receives in this case on wakening a signal informing it that a contactless transaction is beginning.

The operating system then configures the block 107 in order to use the power received by the contactless interface 3.

This has the disadvantage of consuming energy derived from the contact interface 7, the time required by the operating system to divert the block 107 to the source of energy derived from the contactless interface 3.

In order to compensate for this disadvantage, in embodiments, the block 106 is configured by the application such as to comply with the consumption limits from the contact interface 7, via a register.

In this case, it is the block 106 which otherwise reconfigures the block 107 before waking the block 108 (CPU), which avoids excessive consumption on the contact interface 7.

When the contactless transaction via the interface 3 is halted (the power received by this interface has fallen below a predetermined critical threshold) and when the transaction via the contact interface 7 is still pending, the consumption limitations require that the block 108 be transferred immediately to sleep mode (owing to the insufficient current resources).

This is performed automatically in this case by this block 106.

In another implementation, a step makes provision for the fact that the application itself imposes that the block 108 immediately returns to sleep mode.

Indeed, the block 107 informs the application processed by this block 108 at a given time (owing to interruption of the supply of power via the contactless interface 3, transition from "Active" to "Stop").

A signal indicating this interruption of power supply is received by the application which is capable in response to divert its processing and call up as rapidly as possible the instruction of the block 108 which allows its transfer to sleep mode.

In such embodiments, this is performed before the voltage available by the contactless interface 3 has become insufficient.

The means 102—and/or suitable steps—of immediate warning respectively comprise blocks of peripherals and communication steps in series.

On output, interruptions are issued when reception buffer memories are full, i.e. when a contactless protocol template is received and can be processed by the chip 6.

This makes it possible for the application to perform some processing operations without being disturbed by reception of data.

These interruptions indicate to the application that data are available for processing.

In view of the above, one understands that the couple object 1 and terminal 2 in accordance with the invention is in particular, owing to the addition of the statuses 17 status of field pickup pending and 18 pickup of field in deep sleep, capable of complying with the currently applicable standards in case of operation with dual interfacing.

In particular, the problems encountered above are solved.

Therefore, it is not necessary to reinitialise the chip 6, unlike the effect currently induced by compulsory activation of reset of the contact interface 7.

This, while ensuring that a transaction in progress via the contactless interface continues to progress normally and that the response known as "ATR" currently awaited on activation of reset of the contact interface is returned by the contact interface even though it has not be actually reinitialised.

In other words, one attempts to allow maintenance of a contactless transaction in progress during start-up of the contact interface.

It should be noted in this respect that it is essential that the so-called "ATR" response occurs within a given period of time, which constitutes an additional subsidiary problem.

When an object 1 according to the invention is supplied simultaneously by its two interfaces 3 and 7, if the mode PauseC is activated, the clock source complies with the standards currently imposed that the terminal 2 ceases to supply the clock required for the contact application 9.

This is achieved via the means 19 of selection by the operating system of the external resources.

An advantage in this case is to allow an application to function without consuming resources (power and/or clock in this case) derived from the contact interface 7 when this is required.

In the case of an object 1 processing an application 9 in favour of the terminal 2, it is now possible to activate another application 10 the data of which pass through the contactless interface 3.

In other words, with the invention, when the object 1 is processing a contact application, it is now possible for this object to accept the beginning of a contactless application, simultaneously.

The invention therefore offers fully simultaneous management of two concurrent applications 9 and 10 and allows the asynchronous arrival of a contactless template without disturbing the application in progress.

The means of immunity 22 and switching 24 guarantee in the embodiment in FIG. 5, the immunity of the object 1 in the face of a power cut of the object 1 by its contactless interface 3.

The advantage lies in allowing a contactless application 10 to operate without consuming resources (power) derived from the contact interface 7 when the latter forbids this.

With two interfaces or more (Contact, contactless, USB, etc. . . . ) in an object 1, the simultaneous use of at least two of these interfaces is possible with the invention.

An application executed in the object 1 is therefore capable of determining which are the active interfaces (i.e.: how many and which of the interfaces provides the supply and clock).

Consequently, an onboard application in the object 1 is capable of making the necessary decisions according to the status of the interfaces 3 and 7.

Consequently, this application can function correctly, in the case of disconnection for example.

The table below summarises the advantages and specific features of the invention.

TABLE 3

(situation with the invention)

| | | Transitions FIG. 6 & 7 | |
|---|---|---|---|
| | | From: | To: |
| INVENTION | | | |
| Transition on RF | No reset | 12 | 16 |
| with Vcc active | No reset | 16 | 12 |
| Transition on Vcc | No reset on appli. ISO | 15 | 16 |
| With RF active | Suppl. & Clock from ISO | 16 | 15 |
| PauseC ON/OFF | No reset on appli. ISO | 17 | 18 |
| With RF active | No reset, but initial status possible | 18 | 17 |
| Transition on RF | Chip sleep except if CPU active, suppl. & Clock RF, appli. Possible | 14 | 18 |
| With PauseC | No reset, but initial status possible | 18 | 14 |
| Sleep ON/OFF | No reset on appli. RF, suppl. From RF, CPU active | 16 | 17 |
| With RF active | No reset during transition, but initial status possible | 17 | 16 |
| Transition on RF | Chip in pauseC but CPU active, suppl. from RF, appli. RF possible | 13 | 17 |
| with Sleep mode | No reset during transition, but initial status possible | 17 | 13 |
| Transition on Vcc | No reset on appli. ISO | 17 | 15 |
| With RF active & low cons. mode | Suppl. RF & Clock from RF | 18 | 15 |
| BEHAVIOUR OF INVENTION | | | |
| Impact on Circuit reset | Reset normal, idem contact chip only | 16 | 16 |

The invention claimed is:

1. A process for allowing simultaneous functioning of a contact interface device and a contactless interface device in an intelligent portable data object, wherein:
    said contact interface device and said contactless interface device have respective power supplies that include a plurality of operating states, and
    said intelligent portable data object is configured to reset in the event of simultaneous operation of both of said interfaces,
    said process including:
        in the event of a change in state of one or more of said power supplies, storing in a memory device information corresponding to the change in state; and
        based on the stored state information, preventing the reset of the portable data object by the contact interface.

2. The process according to claim 1, wherein the stored information is an interrupt generated by a supply controller based on a variation in availability of at least one of said power supplies.

3. The process according to claim 2, wherein the supply controller selectively generates the interrupt in the event of:
    a transition from a state of low consumption to supply via the contactless interface device, wherein the interrupt is generated when the voltage said contactless interface device is higher than a threshold voltage;
    a transition from supply via the contactless interface to the cessation of the supply, wherein the interrupt is generated when the voltage received by the contactless interface device is lower than the threshold voltage;
    a transition from supply via the contactless interface device to supply via the contact interface device; and
    a transition or reset sequence commanded by the contact interface device, and the power source is provided to the contact interface.

4. The process according to claim 3, wherein, during said transition from supply via the contactless interface to the cessation of the supply the object is placed in a sleep state.

5. The process according to, claim 3, wherein the value of the threshold voltage is predetermined, said threshold voltage being slightly higher than a minimum voltage for operation of the object.

6. The process according to claim 1, wherein the process comprises at least one step of immediate warning for fully simultaneous management of power or clock resources.

7. The process of claim 1, wherein preventing the reset includes delaying the reset for a predefined period of time.

8. The process of claim 1, wherein preventing the reset includes simulating the reset.

9. A device for allowing simultaneous functioning of a contact interface and a contactless interface in an intelligent portable data object that is otherwise configured to reset in the event of simultaneous operation of said interfaces, said system comprising
    means for storing information corresponding to the change in state in the event of a change in state of one or more said power supplies corresponding, respectively, to said interfaces; and
    means for preventing the reset of the portable data object by the contact interface based on the stored state information.

10. The device of claim 9, wherein the means for preventing the reset delays the reset for a predefined period of time.

11. The device according to the claim 10, wherein the device includes means of immunity comprising, a power supply controller which detects the appearance or the disappearance of the power supplies.

12. The device according to the claim 11, wherein the means of immunity includes, means for the fully simultaneous management of power, clock or delay resources.

13. The device according to claim 10, further comprising means for providing immediate warning, of changes in power supply or clock resources.

14. The device according to claim 10, wherein the device is configured to delay the simulation of resetting ordered by the contact interface during a transition aiming to reinitialise the object during a change in the power supplies.

15. The device according to the claim 14, comprising: means for supplying the object with the object information regarding the appearance or disappearance of voltage derived from the contact interface or the contactless interface.

16. The device according to claim 14, wherein the device comprises a functional block forming a sleep controller, said sleep controller controlling the object to conform to constraints of low consumption during sleep states.

17. The device of claim 9, wherein the means for preventing the reset simulates the reset.

* * * * *